(12) United States Patent  
Gaillard et al.

(10) Patent No.: US 8,938,647 B2  
(45) Date of Patent: Jan. 20, 2015

(54) SYSTEM AND METHOD FOR CAPTURING AND USING WEB PAGE VIEWS IN A TEST ENVIRONMENT

(75) Inventors: Jean Francois Gaillard, La Colle sur Loup (FR); Karine Gaillard, legal representative, La Colle sur Loup (FR); Christophe Aubert, Valbonne (FR); Christian Martin, Villeneuve Loubet (FR)

(73) Assignee: SAP SE, Walldorf (DE)

( * ) Notice: Subject to any disclaimer, the term of this patent is extended or adjusted under 35 U.S.C. 154(b) by 135 days.

(21) Appl. No.: 13/537,471

(22) Filed: Jun. 29, 2012

(65) Prior Publication Data

US 2014/0006865 A1 Jan. 2, 2014

(51) Int. Cl.  
*G06F 11/00* (2006.01)

(52) U.S. Cl.  
USPC .......................................................... 714/32

(58) Field of Classification Search  
CPC ............ G06F 11/3672; G06F 11/3664; G06F 11/3668; G06F 11/3684  
See application file for complete search history.

(56) References Cited

U.S. PATENT DOCUMENTS

| | | | | |
|---|---|---|---|---|
| 8,341,462 | B2 * | 12/2012 | Broda et al. | 714/25 |
| 2004/0078684 | A1 * | 4/2004 | Friedman et al. | 714/38 |
| 2011/0283148 | A1 * | 11/2011 | Rossi | 714/38.1 |
| 2012/0221967 | A1 * | 8/2012 | Kwan | 715/763 |
| 2012/0246515 | A1 * | 9/2012 | Lusenhop et al. | 714/32 |
| 2013/0007520 | A1 * | 1/2013 | Giammarresi et al. | 714/32 |
| 2013/0007711 | A1 * | 1/2013 | Fryc et al. | 717/124 |

* cited by examiner

*Primary Examiner* — Charles Ehne  
(74) *Attorney, Agent, or Firm* — Schwegman Lundberg & Woessner, P.A.

(57) ABSTRACT

A system assembles a plurality of views into a plurality of view sets. A view set includes at least one view, and a view includes at least one configuration. The view configuration includes sets of fields and locations of the fields in the view. The system displays one of the plurality of view sets as a web page in a window, and the system generates a view component using a union of the fields belonging to the different configurations defined for the view. The view component includes a test element for the corresponding view, the view component includes a plurality of parameters wherein each parameter is linked to a single view field, and the view component includes no duplication of fields.

33 Claims, 7 Drawing Sheets

SYSTEM AND METHOD FOR CAPTURING AND USING WEB PAGE VIEWS IN A TEST ENVIRONMENT

TECHNICAL FIELD

The present disclosure relates to a system and method for capturing and using web page views in a test environment,

BACKGROUND

Two issues in the context of testing a software application are the re-usability and maintainability of tests and test data. Specifically, while it is relatively easy to implement test cases, it can quickly become difficult to maintain the test cases and even more challenging to create test cases that can be re-used for various scenarios. Moreover, in the context of testing business processes, this becomes even more important since those processes support various scenarios that have to be tested in order to insure that the system is behaving properly.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Some test tools permit a tester or other user to create automatic tests. For example, such a test tool can inspect the structure of user interface elements (such as graphic user interface (GUI) screens) directly in the system where they are defined, and build so-called screen components. Such GUI screens are distinct from web-based screens such as a customer relations management (CRM) web client user interface. These screen components, as reusable elements, are then used to build and run test scenarios, either by third party tools (e.g., Hewlett Packard's Quality Center/Quick Test Professional), or tools that are internal to the developer of the software system.

View components, which are distinct from GUI screen components, are based on web client technology. Each view component is a re-usable entity that contains all the parameters (i.e., user interface field names and values) present in a given view on the web page. A test engineer uses these view components by supplying the parameter values as required, and combines them with "default components" to build a consistent test scenario. A default component represents a generic action on a portion of a web page that does not substantially affect any testing of the web page, such as an informational script or a tool bar. A test scenario of view components can be automatically run by a tool (e.g., HP Quick Test Professional). A view component presents a particularity—it embeds all the different configurations defined for the view into one single component, and it also takes into account the choices made by the customer in the design layer.

Figure 1:
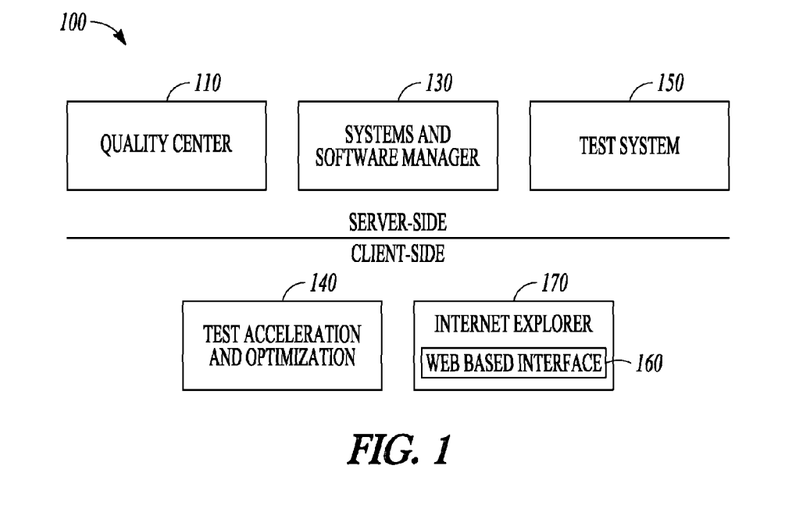
FIG. 1 is an example of an architecture that can be used in connection with a testing scenario.

A first embodiment of the use of view components in a test scenario uses a first overall architecture, and a second embodiment uses a second overall architecture. The embodiments extract (from a view) and save a test scenario (one or more view components), generate a test out of the scenario, and execrate the test. FIG. 1 illustrates an example of the first architecture 100. In this case, a test framework is provided by the quality center 110. The quality center 110 stores the tests and test components and organizes the test and test components into folders and sub-folders. From the quality center 110 one can also launch the execution of a test. The systems and software manager 130 is a module that oversees the operation of the software system that is the target or focus of the test. The systems and software manager 130 also contains code that is responsible for collecting a target system's user interface information like the fields contained in a view, their labels, their types, etc. This coding can be referred to as a collector. In an embodiment, while this code is located on the systems and software manager 130, it is really considered part of the test and optimization module 140. In the example of FIG. 1, it is the test system 150. The test and optimization module 140 is a test tool, and it can work with other tools in a testing chain. For example, the test and optimization module 140 records and generates tests made of test components. Another test tool such as the quality center 110 can store the tests made by the test and optimization module 140, and another test tool can execute the tests stored in the quality center 110. The web-based user interface 160 includes one or more fields. The web-based user interface 160 or web page is displayed via the browser 170. As a whole system, the test acceleration and optimization module 140 communicates with the systems and software manager module 130, which in turn forwards requests to the test system 150 whenever needed. The test acceleration and optimization module 140 also communicates with the quality center 110 via a specific application program interface. The test acceleration and optimization module 140 uses the web-based interface 160 and browser 170 on the client side to record web-based scenarios. The browser 170 is also useful to access the quality center 110 on the client side.

Figure 2:
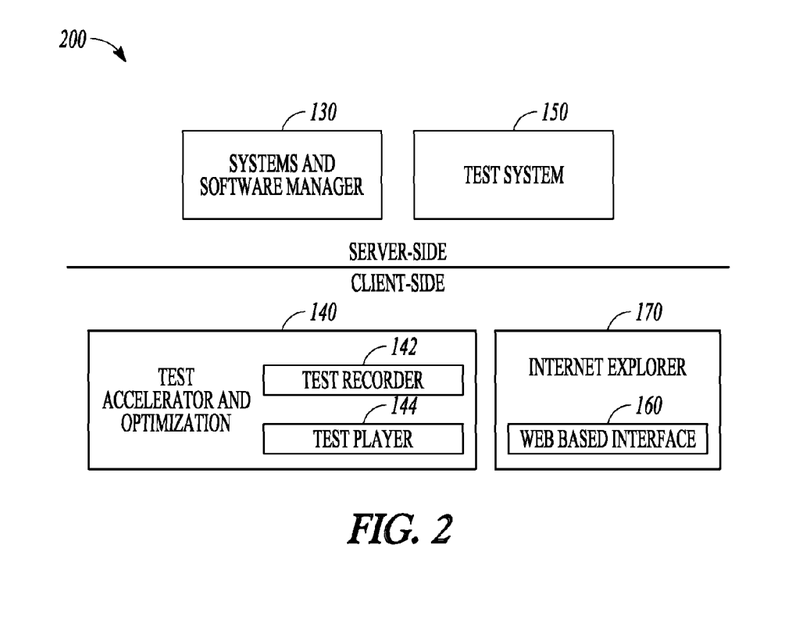
FIG. 2 is another example of an architecture that can be used in connection with a testing scenario.

Referring to FIG. 2, the second architecture 200 includes several of the same components as the architecture 100 of FIG. 1. Specifically, the architecture 200 includes the systems and software manager 130, the test system 150, the test accelerator and optimizer 140, the web-based user interface 160, and the browser 170. FIG. 2 further illustrates that the testing accelerator and optimizer 140 includes a test recorder 142 and a test player 144. The test recorder 142 captures and records the configuration elements that make up the view components, and the test player 144 executes the test using the view components. As can be seen from FIG. 2, the architecture 200 does not include or rely on a test tool 120 or an associated quality center 110. The systems and software manager 130 allows a tester to compose the view components and the test scripts generated either by the test accelerator and optimizer 140 or by manual composition, and the systems and software manager 130 allows the tester to store and run the tests.

Figure 3:
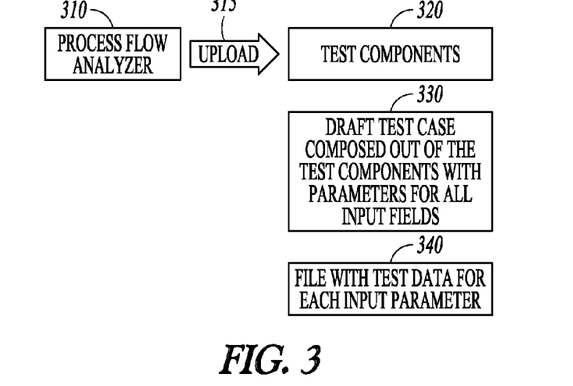
FIG. 3 is an example of a test case.
Figure 4:
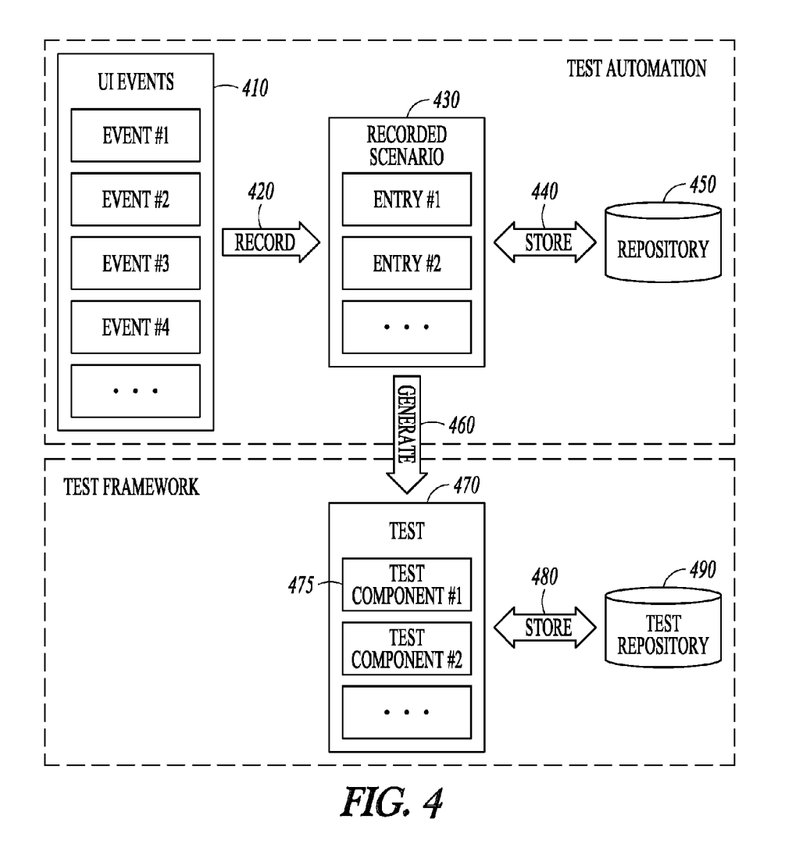
FIG. 4 is another example of a test case.

In general, as illustrated in FIG. 3, a test case is built out of screen components for a graphical user interface and is the result of the composition of several test components. A process flow analyzer 310 allows a recordation of a business scenario and a transformation 315 of this recording into a sequence of re-usable entities called test components 320. There are test components 320 for each GUI sub-screen which include parameters for all fields. This sequence forms the test case 330 and is stored in a repository of the chosen test framework (such as the HP Quality Center). The test case 330 is composed of the test components and includes parameters for all input fields. The data used in the test case are stored in a separate file 340. Each test component of the test case refers to one or several data values stored in this file. FIG. 4 illustrates this concept in more detail. Specifically, the test automation at 420 records user interface events 410 as recorded scenarios 430. These scenarios 430 are stored in a repository 450 at 440. At 460, a test framework is generated and this test framework includes a test 470, which includes test components 475. At 480, the test 470 with its test components 475 is stored in repository 490.

FIG. 4 also illustrates the general principle of test automation in a screen component environment. The user or tester records a scenario using the process flow analyzer. The scenario (e.g., the creation of a customer contact) can be summarized as a sequence of events, as follows. Three initial events include the launching of a web client application, the selection of a business role, and the selection of a link in a navigation bar. These are all default components, which have no fields or field values per se. In this example, the three initial events are followed by filling in field values or making selections from drop down menus. These are view components values that are entered or selected by a user. As a last step in this example, a save button is selected to save the values input by the user. This last step of the save button involves a default component also. These events are recorded by the process flow analyzer 310, which then converts them to "Entries". Each scenario entry is then stored in a repository for later use. When the user is ready to generate the corresponding test, the sequence of entries is read from the repository, and those entries are converted to "components" that are stored in a repository of the test framework (e.g., the quality center 110).

More specifically, one entry is converted to exactly one component of type "default component" (this is usually the case for generic actions like clicking a button). One or several consecutive entries are grouped together to form a "view component" such as the events that require the entry of data by a user (as long as they occur in the same CRM view). More specifically, default components are those components that are predefined components (can be delivered with the testing accelerator and optimizer or other software module), and allowed to perform atomic and generic actions like launching an application, clicking a button, setting a value in a field, getting a value from a field, and checking a value. View components, on the other hand, are specific to each web view encountered by the user during the scenario. They are not predefined but generated after the recording, by a process called "inspection". The inspection of a view consists of collecting all the data that define the view (at design time) directly in the managed system. The nature, type, and length, of each user interface control appearing in the view are gathered and returned to the frontend in order to generate the corresponding view component. Each view component is named after the application name and view name, in order to be reused later in other scenarios that use the same view.

Figure 5:
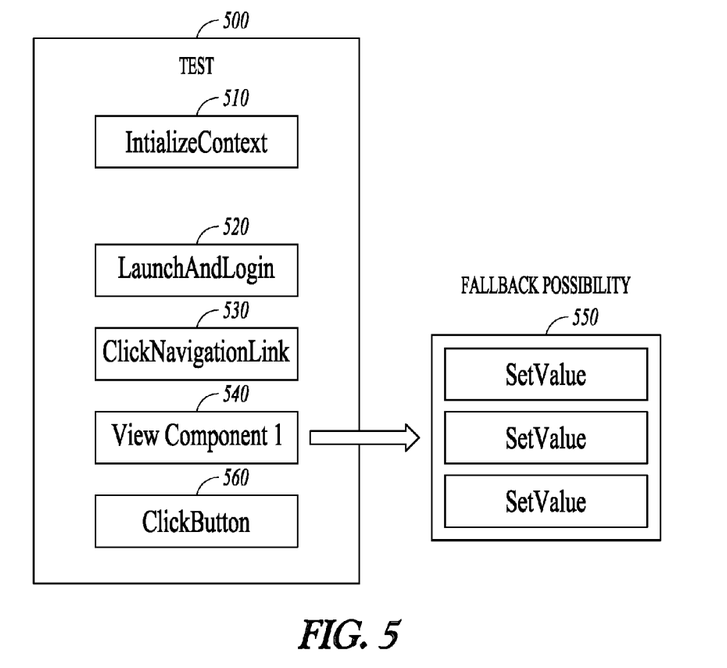
FIG. 5 illustrates an example of building a test.

Then, the complete test can be built by using the different components identified or created during the scenario recording. For example, referring to FIG. 5, the test 500 is built as follows. After initializing the context 510, launching and logging on at 520, and selecting a link 530, the view component 540 could be replaced by three successive default components 550 to fill the three corresponding fields of the view. The value for the view component 540 is entered by clicking on button 560. The advantages of using a view component include restricting the number of components used within a test, reusing an entity for each test that uses the same view, and enabling the use of a change analysis (look for the tests impacted by a change in a view, after an upgrade for example).

In summary, in a GUI test component scenario, business scenarios can be recorded, stored in a repository, and later on converted into "tests". It should be noted that if architectures 100 and 200 are being used, then the same repository and the same test composition can be used for each of these architectures. That is, only the test format is specific to the test framework.

In web client development, building an application consists of assembling the views into larger structures called view sets, which are in turn assembled to build a window (i.e., a web screen). This window object contains the exhaustive list of user interface fields that the screen can potentially cover, which is the sum of all fields defined in each particular view. The content of the views that the end-user actually sees in a given web screen of an application is the result of three successive filters—configurations, a design layer, and personalization.

As noted above, a view configuration is a set of user interface fields that are selected among all the possible fields of one view. A view configuration also defines the position where each field will appear within the view. At runtime, only one configuration is chosen among all defined configurations for each view. The determination of the view that is chosen for any particular web page is not critical to the workings of the embodiments of this disclosure.

The design layer is a customizing activity where the end-user can choose to show/hide a particular field of any view, to enable/disable it, to make a field mandatory, or to change the label of a field, among other possibilities. At runtime, this design layer is applied after the choice of the view configuration. Thus it modifies the rendering of the fields initially contained in the view configuration displayed.

The final rendering of a view can also be influenced by a third actor called personalization, which, however, does not modify the nature and number of fields displayed in each view. This level is set by the end-user. Personalization in general refers to any specific modifications that pertain to a specific user or tester. End users can personalize a view to modify the position of certain fields or to hide certain fields. However, an embodiment does not allow an end user to add a new field or to change a field label.

Then, the content of the pages is an assembly/composition of views which render a different content according to the configuration/design layer/personalization trio.

The goal of the test accelerator and optimizer 140 is to generate tests that represent as much as possible the underlying composition of the views. Those tests are then based on the view components. As explained above, view components are then assembled within a test to map the scenario of the end user within the web-based application. But, in order to maximize the re-usability of the view component, they have to be generic enough to cover the various usages of the view. This genericness of the views is accomplished as follows. Included in a view component are the fields that are present in the union of all configurations defined for the view, with duplicate fields being eliminated. It is noted that if all possible fields were chosen without considering the configurations, that would have resulted in a too large number of fields, making the component huge and thus useless for the end-user (readability, ease of use, performance issues). Additionally, the design layer is taken into account for each view, especially because it can modify the label of some fields or hide/disable other ones, a feature that must be reflected in the resulting view component. This special handling makes the view component unique and versatile. This is a powerful object that assists users to build efficient test scenarios without concerning themselves too much about re-usability, and that fits the requirements of the change analysis process within application lifecycle management.

An embodiment makes the testing of web application views generic and automatic. A view includes fields and a plurality of defined configurations for the view. The method creates a View component, which aims to cover the usage of different pieces of user interfaces in any testing scenario that involves the user interfaces. The method considers not only the exhaustive or potential content of the view, but also the union of the view configurations so that the view (or test) component is still understandable and readable by a user and covers any usage of the view, which lends itself to achieving the goal of re-usability. Compared to other testing systems and procedures, the view component makes use of both the front end aspect of the application (i.e., a web page) and the available meta data on the backend. As will be further detailed below, such front end and meta data can be delivered in part by the provider of a software system, and can be further customized and personalized by a system user or tester.

The union of the defined view configurations contributes to the re-usability of the view (test) components. That is, an advantage is the consideration and use of a union of view configurations that filters out the list of fields in the plurality of view configurations for any particular view, thus making the view or test component re-usable, readable, and understandable.

An embodiment can be divided into two parts—a web-based user interface portion and a test portion. The web-based user interface includes a window. The window includes view sets, wherein each view set includes a set of views. A view configuration is a way to display a set of view fields to a user, such that a view contains many fields. The test portion includes view components. A view component corresponds to a particular view, and each view component includes parameters, wherein each parameter corresponds to a single, particular view field.

Figure 6:
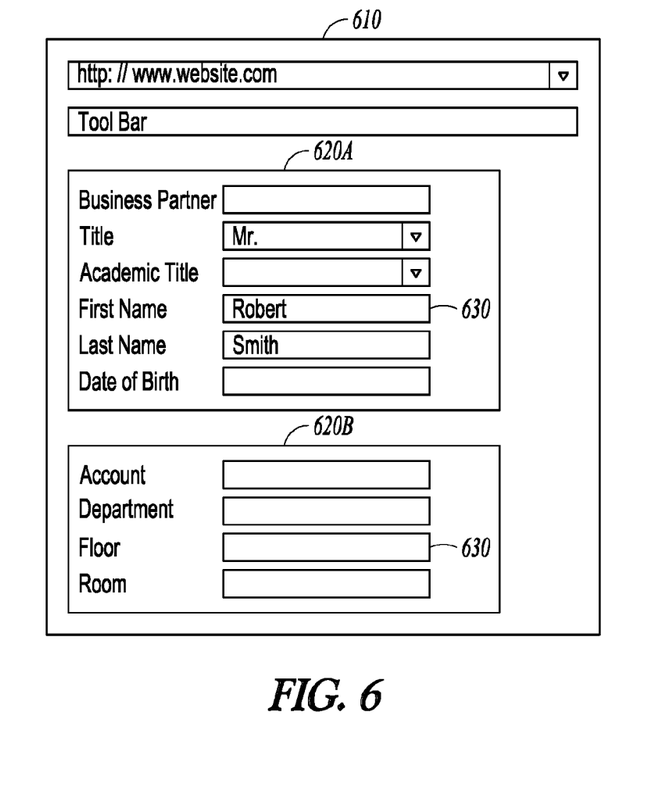
FIG. 6 illustrates an example of a window, views, and view fields within the views.
Figure 7:
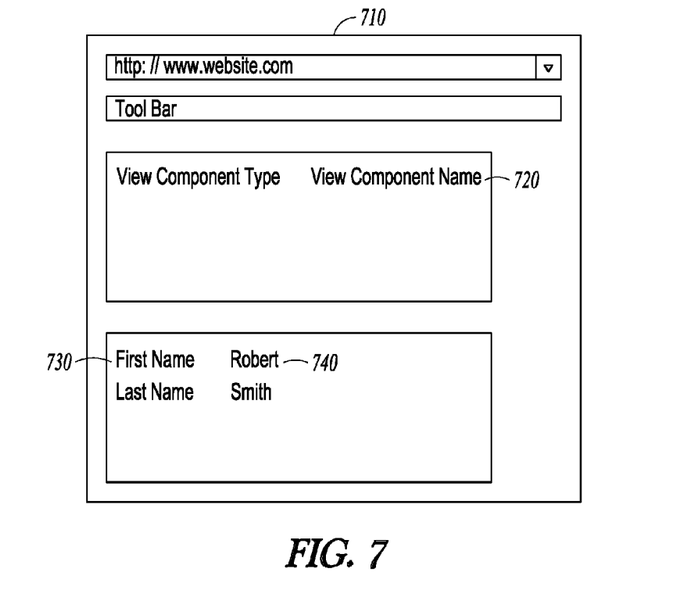
FIG. 7 illustrates an example of a screen and a corresponding test.
Figure 8:
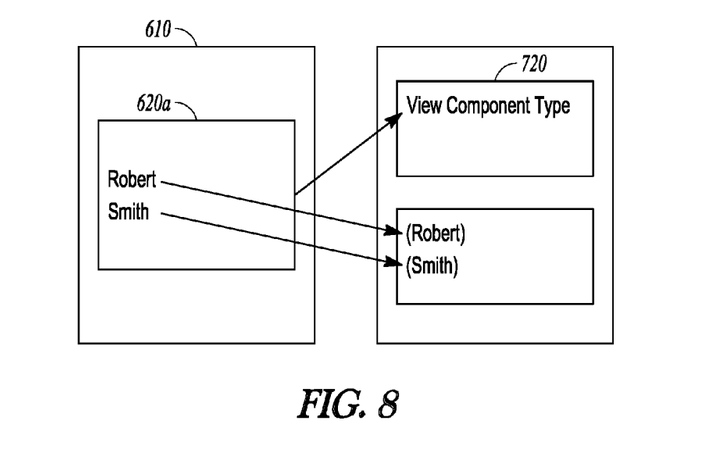
FIG. 8 illustrates an example of a view that is linked to a view component in a test.

FIGS. 6, 7, and 8 illustrate examples of these features and the interrelationships among them. FIG. 6 illustrates the window 610 that includes a view 620A and 620B, and the fields 630 within the views 620A, 620B. A set of views is 640. FIG. 7 illustrates a screen 710 and a corresponding test. The test contains view components 720, parameters 730, and parameter values 740. FIG. 8 illustrates the manner in which a view 620A is linked to a view component 720 in a particular test, and further how the fields 630 are linked to view component parameter fields 730.

Figure 9:
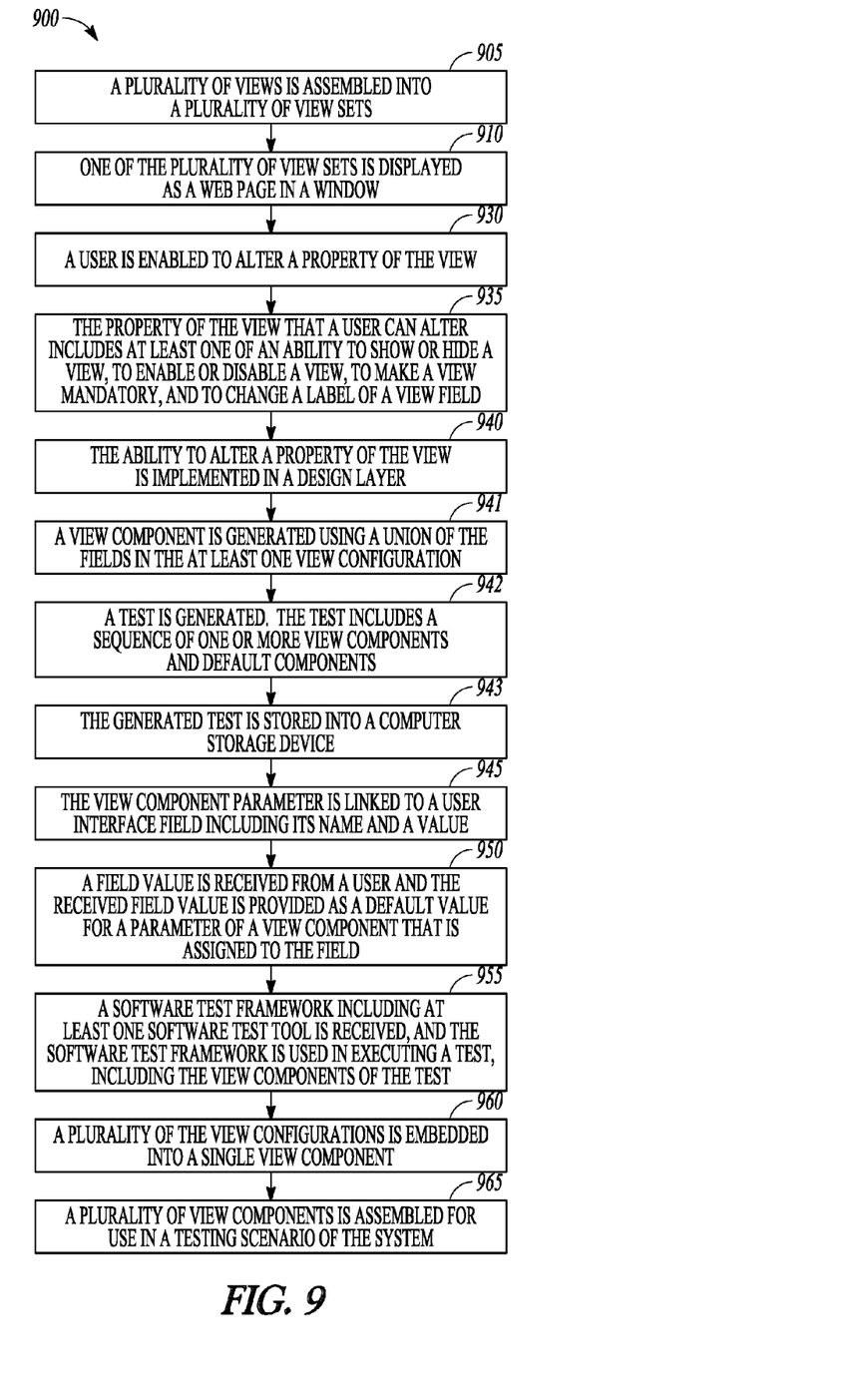
FIG. 9 is a flowchart like diagram illustrating steps and features of a system and method for capturing and using web page views in a test environment.

FIG. 9 is a flowchart-like diagram illustrating the steps and features of an example process 900 for capturing and using web page views in a test environment. FIG. 9 includes a number of process blocks 905-965. Though arranged serially in the example of FIG. 9, other examples may reorder the blocks, omit one or more blocks, and/or execute two or more blocks in parallel using multiple processors or a single processor organized as two or more virtual machines or subprocessors. Moreover, still other examples can implement the blocks as one or More specific interconnected hardware or integrated circuit modules with related control and data signals communicated between and through the modules. Thus, any process flow is applicable to software, firmware, hardware, and hybrid implementations.

Referring to FIG. 9, at 905, a plurality of views is assembled into a plurality of view sets. A view set includes at least one view. A view includes at least one configuration. The view configuration includes sets of fields and locations of the fields in the view. At 910, one of the plurality of view sets is displayed as a web page in a window.

At 930, a user is enabled to alter a property of the view. At 935, the property of the view that a user can alter includes at least one of an ability to show or hide a view, to enable or disable a view, to make a view mandatory, and to change a label of a view field. At 940, the ability to alter a property of the view is implemented in a design layer. At 941, a view component is generated using a union of the fields in the at least one view configuration. The view component includes a test element for the corresponding view. The view component includes a plurality of parameters, and each parameter is linked to a single view field. The view component comprises no duplication of fields. At 942, a test is generated. The test includes a sequence of one or more view components and default components. At 943, the generated test is stored into a computer storage device. The view components that the stored test contains can be reused in a plurality of tests of the system.

At 945, the view component parameter is linked to a user interface field including its name and a value. At 950, a field value is received from a user and the received field value is provided as a default value for a parameter of a view component that is assigned to the field. At 955, a software test framework including at least one software test tool is received, and the software test framework is used in executing a test, including the view components of the test, of software of a system. At 960, a plurality of the view configurations is embedded into a single view component. At 965, a plurality of view components is assembled for use in a testing scenario of the system.

Figure 10:
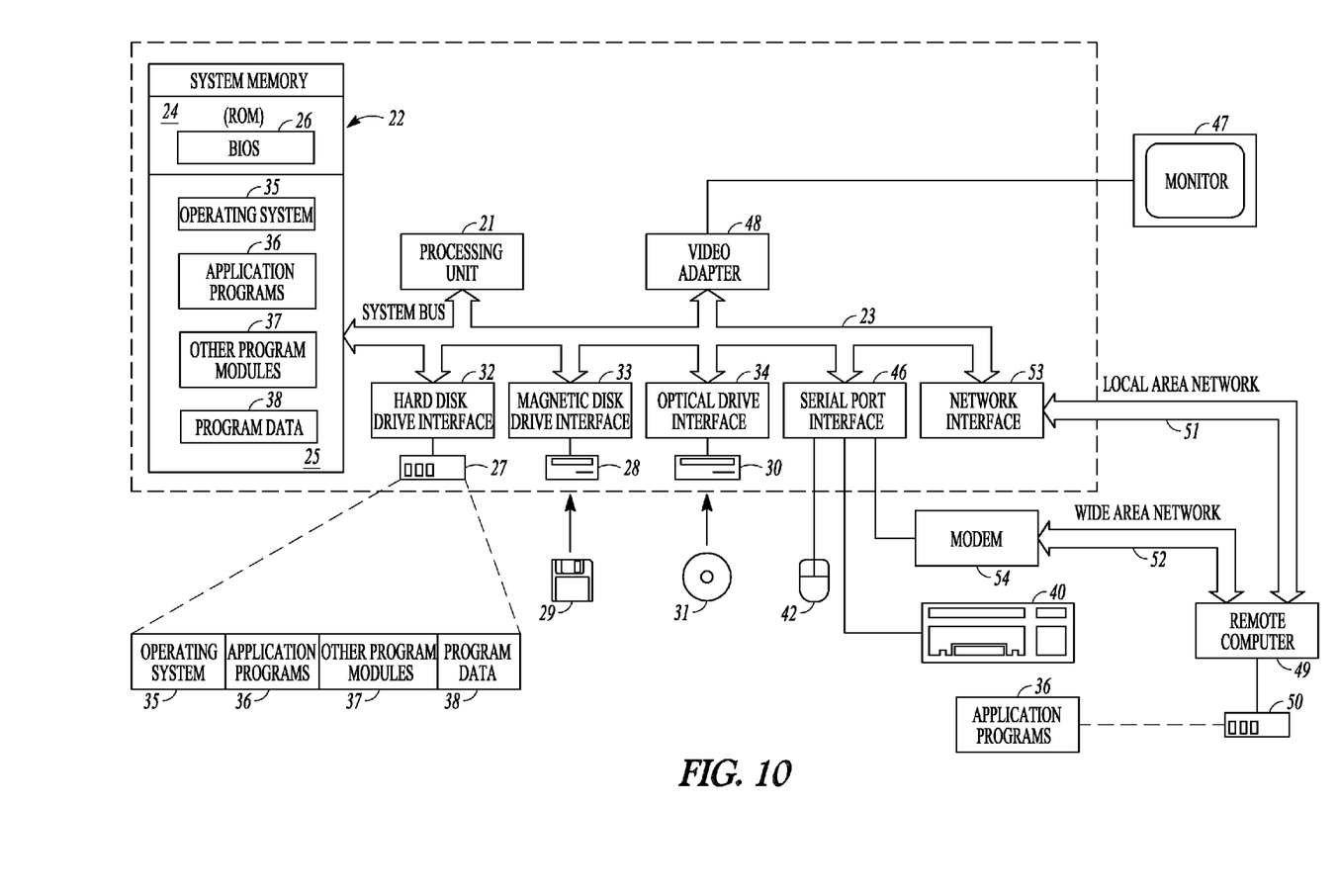
FIG. 10 is a block diagram of an example embodiment of a computer system upon which an embodiment of the present disclosure can execute.

FIG. 10 is an overview diagram of hardware and operating environment in conjunction with which embodiments of the invention may be practiced. The description of FIG. 10 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 10, a hardware and operating environment is provided that is applicable to any of the servers and/or remote clients shown in the other Figures.

As shown in FIG. 10, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of Computer 20 comprises a single central processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32; a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks. Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36; other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 10 include a local area network (LAN) 51 and/or a wide area network (WAN) 52. Such networking environments are commonplace in office networks, enterprise-wide computer networks, intranets and the interne, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising;
   a computer processor and a computer storage device configured to:
   assemble a plurality of views into a plurality of view sets, wherein a view set comprises at least one view, and, wherein a view comprises at least one configuration, the view configuration including sets of fields and locations of the fields in the view;
   display one of the plurality of view sets as a web page in a window; and
   generate a view component using a union of the fields in the at least one view configuration, wherein the view component comprises a test element for the corresponding view, wherein the view component comprises a plurality of parameters wherein each parameter is linked to a single view field, wherein the view component comprises no duplication of fields, and wherein the view component comprises a reusable entity based on web-client technology and contains all parameters present in the web page.

2. The system of claim 1, wherein the computer processor is configured to generate a test, and wherein the test comprises a sequence of one or more view components and default components.

3. The system of claim 2, wherein the computer processor is configured to store the generated test into the computer storage device, such that the view components that the test contains can be reused in a plurality of tests of the system.

4. The system of claim 1, wherein the computer processor is configured to enable a user to alter a property of the view.

5. The system of claim 4, herein the property of the view that a user can alter comprises at least one of an ability to show or hide a view, to enable or disable a view, to make a view mandatory, and to change a label of a view field.

6. The system of claim 5, wherein the ability to alter a property of the view is implemented in a design layer.

7. The system of claim 1, wherein the view component parameter is linked to a user interface field including its name and a value.

8. The system of claim 1, wherein the computer processor is configured to receive a field value from a user and to provide the received field value as a default value for a parameter of a view component that is assigned to the field.

9. The system of claim 1, wherein the computer processor is configured to:
   receive a software test framework including at least one software test tool; and
   use the software test framework in executing a test, including the view components of the test, of software of the system.

10. The system of claim 1, wherein the view component comprises an embedding of a plurality of the view configurations into a single view component.

11. The system of claim 1, wherein the computer processor is configured to assemble a plurality of view components for use in a testing scenario of the system.

12. A process comprising:
    assembling a plurality of views into a plurality of view sets, wherein a view set comprises at least one view, and wherein a view comprises at least one configuration, the view configuration including sets of fields and locations of the fields in the view;
    displaying one of the plurality of view sets as a web page in a window;
    generating a view component using a union of the fields in the at least one view configuration, wherein the view component comprises a test element for the corresponding view, wherein the view component comprises a plurality of parameters wherein each parameter is linked to a single view field, and wherein the view component comprises no duplication of fields; and
    altering a property of the view;
    wherein the property of the view that can be altered comprises at least one of an ability to show or hide a view, to enable or disable a view, to make a view mandatory, and to charge a label of a view field.

13. The process of claim 12, comprising generating a test, wherein the test comprises a sequence of one or more view components and default components.

14. The process of claim 13, comprising storing the generated test into the computer storage device, such that the view components that the test contains can be reused in a plurality of tests of a system.

15. The process of claim 12, wherein the view component parameter is linked to a user interface field including its name and a value.

16. The process of claim 12, comprising receiving a field value from a user and providing the received field value as a default value for a parameter of a view component that is assigned to the field.

17. The process of claim 12, comprising:
    receiving a software test framework including at least one software test tool; and
    using the software test framework in executing a test, including the view components of the test, of software of the system.

18. The process of claim 12, comprising embedding a plurality of the view configurations into a single view component.

19. The process of claim 12, comprising assembling a plurality of view components for use in a testing scenario of the system.

20. A computer readable storage device comprising instructions that when executed by a processor execute a process comprising:
    assembling a plurality of views into a plurality of view sets, wherein a view set comprises at least one view, and wherein a view comprises at least one configuration, the view configuration including sets of fields and locations of the fields in the view;
    displaying one of the plurality of view sets as a web page in a window;
    generating a view component using a union of the fields in the at least one view configuration, wherein the view component comprises a test element for the corresponding view, wherein the view component comprises a plurality of parameters wherein each parameter is linked to a single view field, and wherein the view component comprises no duplication of fields; and
    altering a property of the view;
    wherein the property of the view that can be altered comprises at least one of an ability to show or hide a view to enable or disable a view, to make a view mandatory, and to change a label of a view field.

21. The computer readable storage device of claims 20, comprising instructions for generating a test, wherein the test comprises a sequence of one or more view components and default components.

22. The computer readable storage device of claims 21, comprising instructions for storing the generated test into the computer storage device, such that the view components that the test contains can be reused in a plurality of tests of a system.

23. The computer readable storage device of claims 20, wherein the view component parameter is linked to a user interface field including its name and a value.

24. The computer readable storage device of claims 20, comprising instructions for receiving a field value from a user and providing the received field value as a default value for a parameter of a view component that is assigned to the field.

25. The computer readable storage device of claims 20, comprising instructions for:
  receiving a software test framework including at least one software test tool; and
  using the software test framework in executing a test, including the view components of the test, of software of the system.

26. The computer readable storage device of claims 20, comprising instructions for embedding a plurality of the view configurations into a single view component.

27. The computer readable storage device of claims 20, comprising instructions for assembling a plurality of view components for use in a testing scenario of the system.

28. A system comprising:
  a computer processor and a computer storage device configured to:
    configure a plurality of views for a web page, wherein the web page is displayable within a window, and wherein each view comprises at least one view configuration, the view configuration including sets of fields and locations of the fields in the view;
    execute a process that displays the web page and the plurality of views;
    capture as a view component a union of the at least one view configuration, wherein the view component comprises a test element for the corresponding view, wherein the view component comprises a plurality of parameters, wherein each parameter is linked to a single view field, and wherein the view component comprises no duplication of fields;
    generate a test, wherein the test comprises a sequence of view components; and
    alter a property of the view;
    wherein the property of the view that can be altered comprises at least one of an ability to show or hide a view, to enable or disable a view, to make a view mandatory, and to change a label of a view field.

29. The system of claim 28, wherein the process displays a plurality of web pages with at least one page comprising at least one different view.

30. The system of claim 28, wherein the view component comprises an embedding of a plurality of the view configurations into a single view component.

31. A system comprising:
  a computer processor and a computer storage device configured to:
    display a web page containing a view set including views, wherein each view includes a set of fields;
    show a view through at least one view configuration, wherein each view configuration defines a set of view fields to display among available fields of the view; and
    alter a property of the view;
    wherein the property of the view that can be altered comprises at least one of an ability to show or hide a view, to enable or disable a view, to make a view mandatory, and to chance a label of a view field.

32. The system of claim 31 wherein the computer processor and the computer storage device are configured to:
  define an automatic test as an ordered sequence of components, wherein a component can either be a default component or a view component;
  define a component as a test element that contains a set of parameters and that can be executed to produce an action on the web page;
  associate a view component to a view and automatically test the view using the view component; and
  associate a view component parameter to a view field.

33. The system of claim 32, wherein selected view fields are linked to corresponding vie component parameters and result in a union of all displayed view fields of all the defined view configurations of the system.

* * * * *